(12) United States Patent
Sandoval

(10) Patent No.: US 10,617,074 B2
(45) Date of Patent: Apr. 14, 2020

(54) PLANT WATERING DEVICE

(71) Applicant: Robert Sandoval, Phoenix, AZ (US)

(72) Inventor: Robert Sandoval, Phoenix, AZ (US)

( * ) Notice: Subject to any disclaimer, the term of this patent is extended or adjusted under 35 U.S.C. 154(b) by 192 days.

(21) Appl. No.: 15/459,370

(22) Filed: Mar. 15, 2017

(65) Prior Publication Data

US 2017/0265405 A1    Sep. 21, 2017

Related U.S. Application Data

(60) Provisional application No. 62/309,019, filed on Mar. 16, 2016.

(51) Int. Cl.
*A01G 27/02*    (2006.01)
*A01G 25/00*    (2006.01)

(52) U.S. Cl.
CPC .............. *A01G 27/02* (2013.01); *A01G 25/00* (2013.01)

(58) Field of Classification Search
CPC ........ A01G 25/00; A01G 25/14; A01G 27/00; A01G 27/02; A01G 29/00
See application file for complete search history.

(56) References Cited

U.S. PATENT DOCUMENTS

| | | | | |
|---|---|---|---|---|
| 193,417 A | * | 7/1877 | McDonald | A01G 25/14 239/378 |
| 209,372 A | * | 10/1878 | Allen | A01G 25/14 239/378 |
| 212,321 A | * | 2/1879 | Payne | A01G 25/14 239/377 |
| 397,762 A | * | 2/1889 | Trahan | A01G 25/14 239/378 |
| 417,690 A | * | 12/1889 | Trahan | A01G 25/14 239/378 |

(Continued)

FOREIGN PATENT DOCUMENTS

| | | | | |
|---|---|---|---|---|
| CH | 232842 A | * | 6/1944 | ............ A01G 25/14 |
| CH | 346720 A | * | 5/1960 | ............ A01G 27/02 |

(Continued)

OTHER PUBLICATIONS

Machine translation of DE 202014001323 to Schlemmer, published Jun. 2014.*
KR 20000034 A to Cho, published Jan. 2000.*

*Primary Examiner* — Kathleen I Alker
(74) *Attorney, Agent, or Firm* — Boudwin Intellectual Property; Daniel Boudwin

(57) ABSTRACT

A plant watering device. The plant watering device includes an outer container having a plurality of apertures on a lower portion of a first sidewall, an inner container having a second sidewall defining and open upper end and an open lower end, wherein the second sidewall of the inner container is secured to an interior surface of the first sidewall of the outer container via a fastener; and an apron encircling an outer side of the first sidewall. The plant watering device is securable to the ground via a stake. In use, water is poured into the inner container, flows through the open lower end of the inner container to the outer container interior volume, and then exits the apertures of the outer container. This allows the water to gently diffuse around an area where a plant is planted, while the apron prevents soil erosion and damage to the plant.

9 Claims, 2 Drawing Sheets

(56) References Cited

U.S. PATENT DOCUMENTS

| | | | | |
|---|---|---|---|---|
| 1,383,368 A * | 7/1921 | Ambrose | A01G 27/02 47/79 |
| 1,699,459 A * | 1/1929 | Ullrich | A01G 25/14 239/377 |
| 1,702,523 A * | 2/1929 | Schafer | A01G 25/14 239/377 |
| 1,778,030 A * | 10/1930 | Kanst | A01G 29/00 422/278 |
| 2,264,751 A * | 12/1941 | Maxtone-Graham | A01G 25/00 242/615.2 |
| 2,387,340 A * | 10/1945 | Moriarty | A01G 27/02 47/79 |
| 2,791,347 A * | 5/1957 | Boehm | A47G 29/14 165/119 |
| 2,807,505 A | 9/1957 | Weitzel | |
| 4,077,511 A * | 3/1978 | Mosijowsky | A01C 21/00 137/268 |
| 4,763,842 A | 8/1988 | Dunn | |
| 4,866,880 A * | 9/1989 | Weinblatt | A01G 29/00 47/79 |
| 5,253,952 A * | 10/1993 | Selway | A01G 25/00 404/25 |
| 5,533,300 A | 7/1996 | Kesler | |
| 5,692,338 A * | 12/1997 | Rose | A01G 29/00 172/22 |
| 5,704,162 A * | 1/1998 | Holtkamp, Jr. | A01G 27/04 47/79 |
| 5,761,846 A * | 6/1998 | Marz | A01G 25/06 47/48.5 |
| 6,006,472 A * | 12/1999 | Holtkamp, Jr. | A01G 27/02 47/79 |
| 6,672,007 B1 * | 1/2004 | Lai | A01G 27/02 47/79 |
| 7,086,199 B2 * | 8/2006 | Canino | A01G 27/003 222/67 |
| 8,978,296 B2 * | 3/2015 | Zinger | A01G 29/00 47/48.5 |
| 9,726,367 B2 * | 8/2017 | Onyeka | A01G 27/006 |
| 2005/0163569 A1 | 7/2005 | Allen | |
| 2011/0056128 A1 | 3/2011 | King | |

FOREIGN PATENT DOCUMENTS

| | | | | |
|---|---|---|---|---|
| DE | 1053852 B | * | 3/1959 | A01G 25/14 |
| DE | 202014001323 U1 | * | 6/2014 | A01G 25/14 |
| FR | 2662047 A1 | * | 11/1991 | A01G 25/00 |
| GB | 463978 A | * | 4/1937 | A01G 27/02 |
| GB | 845467 A | * | 8/1960 | A01G 25/14 |

* cited by examiner

PLANT WATERING DEVICE

CROSS REFERENCE TO RELATED APPLICATIONS

This application claims the benefit of U.S. Provisional Application No. 62/309,019 filed on Mar. 16, 2016. The above identified patent application is herein incorporated by reference in its entirety to provide continuity of disclosure.

FIELD OF THE INVENTION

The present invention relates to gardening. More specifically, the present invention provides a plant watering device for watering plants without damaging them or causing soil erosion.

BACKGROUND OF THE INVENTION

Many individuals enjoy cultivating and maintaining a home garden. Similarly, gardens are desirable in public spaces, allowing individuals to enjoy a variety of plants. Many types of garden plants do not receive enough water from rainfall alone and must be watered by an individual in order to be healthily maintained.

There exists many means for watering plants, however, these often have considerable drawbacks. One typical way to water garden plants is to utilize a watering can, which individuals fill with water and hold above the plant. It can be difficult to lift a heavy watering can filled with water. Additionally, it is difficult to cover a large area with a watering can. Another common way individuals water garden plants is by spraying the plants with a hose. Water sprayed in this manner can get trapped in the plants' foliage and fail to reach the soil where it may be absorbed by the plant roots. If the water pressure from the hose is too high, delicate plants may be damaged. Further, if the water pressure is too high the soil surrounding the plants is likely to erode, which can further damage the plants and reduce their health and longevity. It is therefore desirable to provide a plant watering device that gently diffuses water over a large area so as not to damage the plants or erode the soil in which they are planted.

Devices have been disclosed in the known art that relate to plant watering devices. These include devices that have been patented and published in patent application publications. These devices generally relate to water delivery devices, such as U.S. Published Patent Application Number 2011/0056128, U.S. Published Patent Application Number 2005/0163569, U.S. Pat. Nos. 2,807,505, 5,533,300, and 4,763,842.

The devices in the known art have several drawbacks. These devices generally relate to complicated watering systems that must be installed in a particular location and cannot be easily utilized to water plants located in remote areas. Further, the devices in the known art fail to provide a device that takes water received from a hose and diffuses it gently over a large surface area.

In light of the devices disclosed in the known art, it is submitted that the present invention substantially diverges in design elements from the known art and consequently it is clear that there is a need in the art for an improvement to existing plant watering devices. In this regard the present invention substantially fulfills these needs.

SUMMARY OF THE INVENTION

In view of the foregoing disadvantages inherent in the known types of plant watering devices now present in the prior art, the present invention provides a plant watering device wherein the same can be utilized for providing convenience for the user when gently watering plants, so as to protect the plant and prevent soil erosion. The plant watering device comprises an outer container having a first base and a first sidewall extending therefrom defining a first interior volume, the first base having a plurality of apertures on a lower portion of the first sidewall; an inner container comprising a second sidewall defining and open upper end and an open lower end, wherein the second sidewall of the inner container is secured to an interior surface of the first sidewall of the outer container via a fastener; and an apron encircling an outer side of the first sidewall, the apron having a circumferential sidewall and an open lower end. The inner container has a maximum width that is less than a minimum width of the outer container.

One object of the present invention is to provide a plant watering device that may be easily transported and deployed to water plants at different locations.

Another object of the present invention is to provide a plant watering device that spreads water over a large surface area, allowing multiple plants to be watered simultaneously.

A further object of the present invention is to provide a plant watering device that slowly diffuses water in order to prevent soil erosion.

Other objects, features, and advantages of the present invention will become apparent from the following detailed description taken in conjunction with the accompanying drawings.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1B:
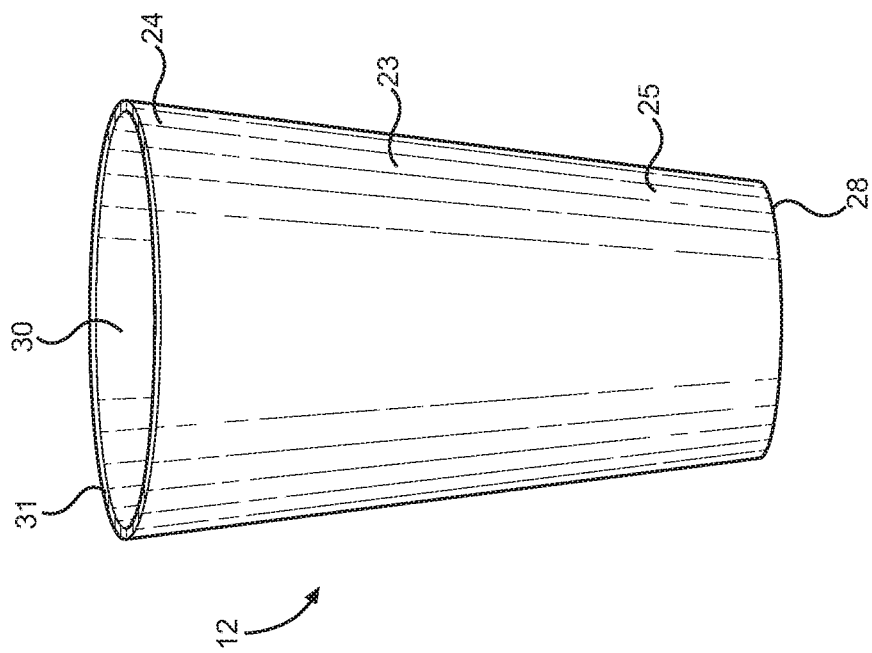
FIG. 1B shows a perspective view of the inner container of the plant watering device.

Reference is made herein to the attached drawings. Like reference numerals are used throughout the drawings to depict like or similar elements of the plant watering device. For the purposes of presenting a brief and clear description of the present invention, the preferred embodiment will be discussed as used for gently watering plants. The figures are intended for representative purposes only and should not be considered to be limiting in any respect.

Figure 1A:
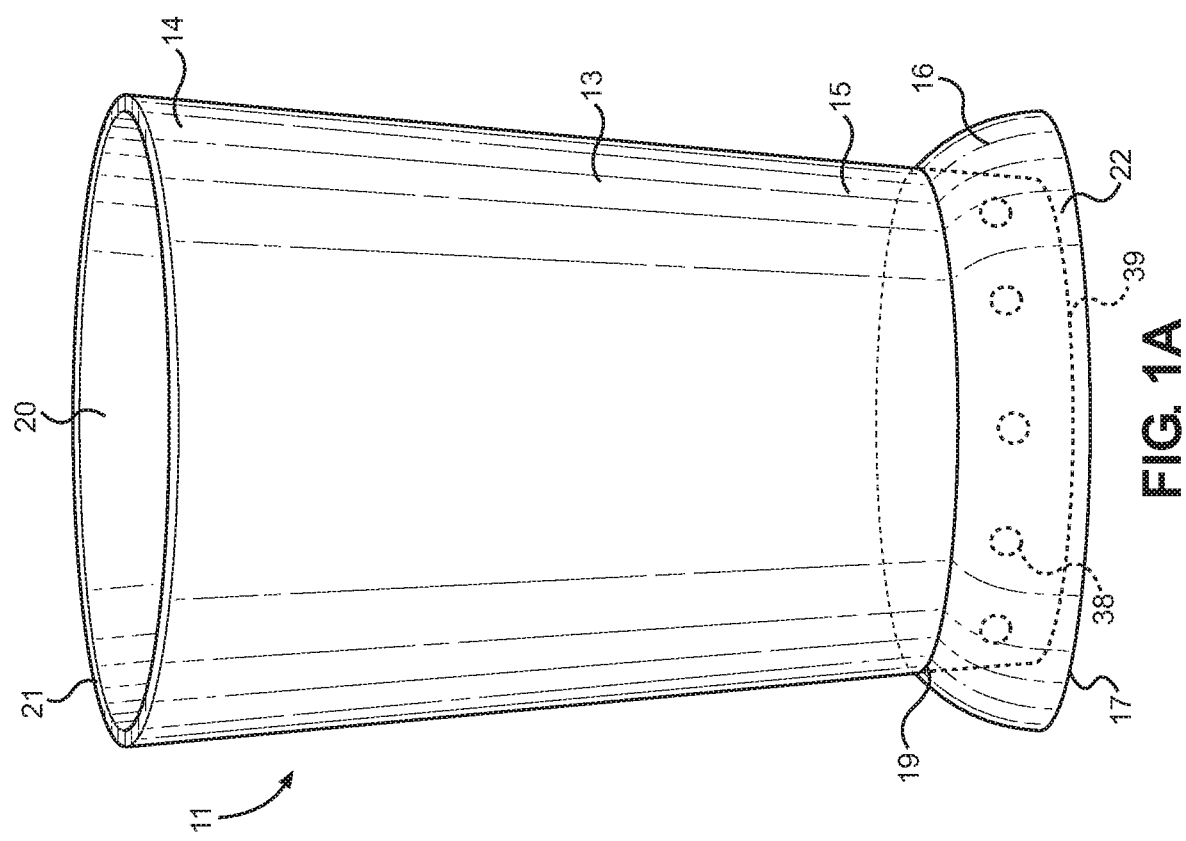
FIG. 1A shows a perspective view of the outer container of the plant watering device.

Referring now to FIGS. 1A and 1B, there is shown a perspective view of the outer container of the plant watering device and a perspective view of the inner container of the plant watering device, respectively. The plant watering device comprises an outer container 11 and an inner container 12 removably insertable therein. Each of the inner container and outer container 11, 12 may be composed of a durable waterproof material such as metal, plastic, or the like.

The outer container 11 includes a base 39 and a sidewall 13 disposed thereon. The diameter of the outer container 11 decreases from an upper portion 14 to a lower portion 15 thereof. The sidewall 13 terminates at an open upper end 21 defining an interior volume 20. A plurality of apertures 38 are disposed on the sidewall 13, such that water poured into the interior volume 20 exits the outer container 11 therethrough. The apertures 38 are arranged in a linear arrangement, such that they encircle the first sidewall 13.

In the illustrated embodiment, the outer container 11 further comprises an apron 22 secured to the sidewall 13 of the outer container 11. The apron 22 extends downward from an upper edge 19 thereof and includes an open lower end 17. The apron 22 further includes a circumferential sidewall 16 having an arcuate shape. In some embodiments, the lower edge 17 of the apron 22 extends downward past the base 39 of the outer container 11.

The inner container 12 includes a sidewall 23 terminating in an open upper end 31, defining an interior volume 30. The inner container further has an open lower end 28 such that it forms a funnel shape. Further, the inner container 12 is shaped similarly to the outer container 11, such that the diameter of the inner container 12 decreases from an upper end 24 to a lower end 25 thereof. The inner container 12 is securable within the outer container 11. Additionally, the diameter of the open lower end 28 of the inner container 12 is greater than the diameter of each of the plurality of apertures 38 of the outer container 11.

Figure 2:
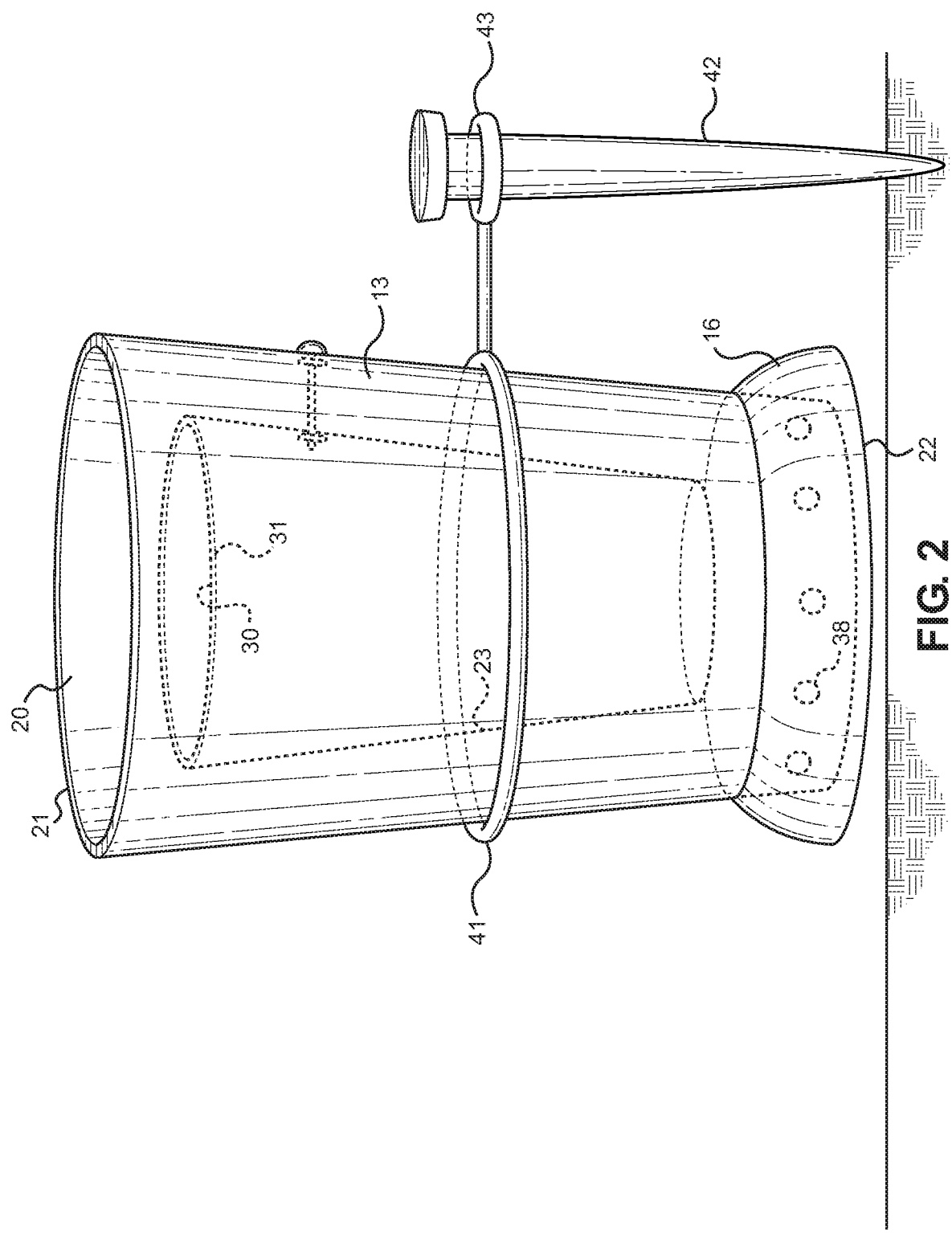
FIG. 2 shows a perspective view of the plant watering device with the inner container inserted into the outer container.

Referring now to FIG. 2, there is shown a perspective view of the plant watering device with the inner container inserted into the outer container. The inner and outer containers are sized such that the maximum width of the inner container is less than the minimum width of the outer container, which allows the inner container to be removably inserted into the outer container through the open upper end 21 thereof, and occupy a portion of the interior volume 20 of the outer container. The inner container 12 is securable to the outer container 11 via a fastener such as a rivet or other suitable fastener. In the illustrated embodiment, the outer container further includes a ring 41 thereon having a connector 43 extending outwardly therefrom, wherein the connector is configured to receive a stake 42 for securing the outer container to the ground, such that the apron 22 is slightly suspended above the soil.

In use, the outer container is placed on the soil near a plant or multiple plants. Water is poured into the interior volume 30 of the inner container through the open upper end 31 thereof. The water flows out of the inner container through the open lower end and into the interior volume 20 of the outer container. The water then flows out of the outer container through the apertures 38 and through the open lower end 22 of the platform 16, where it is then absorb by the soil. The apron prevents water from splashing and eroding the soil or harming the plants. In this way, the water is slowly diffused around the area where the plants are planted, preventing soil erosion and plant damage while allowing the roots of the plants to absorb the maximum amount of water.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A plant watering device, comprising:
   an outer container comprising a first base and a first sidewall extending therefrom defining a first interior volume, the first sidewall comprising a plurality of apertures on a lower portion thereof;
   an inner container comprising a second sidewall defining an open upper end and an open lower end, wherein the second sidewall of the inner container is secured to an interior surface of the first sidewall of the outer container via a fastener;
   whereby a first gap is defined between the first sidewall and the second sidewall;
   an apron encircling an outer side of the first sidewall, the apron having a downwardly curving circumferential sidewall and an open lower end;
   whereby a second gap is defined between the outer side of the first sidewall and an interior side of the downwardly curving circumferential sidewall;
   wherein the inner container has a maximum width that is less than a minimum width of the outer container.

2. The plant watering device of claim 1, wherein the apron comprises an arcuate shape.

3. The plant watering device of claim 1, wherein the plurality of apertures are disposed in a linear arrangement, such that they encircle the first sidewall.

4. The plant watering device of claim 1, wherein the inner container and the outer container are composed of metal.

5. The plant watering device of claim 1, wherein the inner container and the outer container are composed of plastic.

6. The plant watering device of claim 1, wherein a diameter of the lower opening of the inner container is greater than a diameter of each of the plurality of apertures of the outer container.

7. The plant watering device of claim 1, wherein a diameter of the outer container decreases from an upper end of the outer container to a lower end of the outer container, and wherein a diameter of the inner container decreases from an upper end of the inner container to a lower end of the inner container.

8. The plant watering device of claim 1, further comprising a ring secured to the first sidewall of the outer container, the ring having a connector thereon, the connector sized to receive a stake therethrough for securing the outer container to a surface.

9. A plant watering device, comprising:
   an outer container comprising a first base and a first sidewall extending therefrom defining a first interior volume, the first sidewall comprising a plurality of apertures on a lower portion thereof;
   an inner container comprising a second sidewall defining an open upper end and an open lower end, wherein the second sidewall of the inner container is secured to an interior surface of the first sidewall of the outer container via a fastener;

whereby a gap is defined between the first sidewall and the second sidewall;

an apron encircling an outer side of the first sidewall, the apron having a downwardly curving circumferential sidewall and an open lower end;

wherein the inner container has a maximum width that is less than a minimum width of the outer container;

a ring secured to the first sidewall of the outer container, the ring having a connector thereon, the connector sized to receive a stake therethrough for securing the outer container to a surface, wherein each of the connector and the ring is oriented in a plane parallel to a plane defined by the open upper end of the inner container.

* * * * *